United States Patent
Wedekind et al.

(10) Patent No.: US 10,946,731 B2
(45) Date of Patent: Mar. 16, 2021

(54) OPTIMIZED MIDDLE RAIN CHANNEL

(71) Applicant: AISIN TECHNICAL CENTER OF AMERICA, INC., Northville, MI (US)

(72) Inventors: Micah Wedekind, Livonia, MI (US); Michael Mixon, Brighton, MI (US)

(73) Assignee: AISIN TECHNICAL CENTER OF AMERICA, INC., Northville, MI (US)

(*) Notice: Subject to any disclaimer, the term of this patent is extended or adjusted under 35 U.S.C. 154(b) by 0 days.

(21) Appl. No.: 15/929,146

(22) Filed: Aug. 14, 2019

(65) Prior Publication Data

US 2020/0086722 A1    Mar. 19, 2020

Related U.S. Application Data

(63) Continuation-in-part of application No. 16/132,774, filed on Sep. 17, 2018, now abandoned.

(51) Int. Cl.
| | |
|---|---|
| *B60J 10/82* | (2016.01) |
| *B60J 10/90* | (2016.01) |
| *B60J 10/25* | (2016.01) |
| *B60J 7/00* | (2006.01) |
| *B60J 7/043* | (2006.01) |

(52) U.S. Cl.
CPC .......... B60J 7/0084 (2013.01); *B60J 7/043* (2013.01); *B60J 10/25* (2016.02); *B60J 10/82* (2016.02); *B60J 10/90* (2016.02)

(58) Field of Classification Search
CPC ... B60J 10/82; B60J 10/40; B60J 10/33; B60J 10/25; B60J 10/30; B60J 10/90; B60J 7/435

USPC .......................................... 296/213, 216.09
See application file for complete search history.

(56) References Cited

U.S. PATENT DOCUMENTS

| | | | |
|---|---|---|---|
| 5,727,839 A * | 3/1998 | Ruhringer | B60J 7/04 296/213 |
| 6,286,898 B1 | 9/2001 | Mori et al. | |
| 7,628,448 B2 | 12/2009 | Katayama et al. | |
| 8,152,229 B2 | 4/2012 | Horiuchi et al. | |
| 8,876,201 B2 | 11/2014 | Katsura | |
| 9,205,731 B2 | 12/2015 | Koshimichi | |
| 9,290,085 B2 | 3/2016 | Sawada et al. | |

FOREIGN PATENT DOCUMENTS

| | | |
|---|---|---|
| CN | 206623663 U | 11/2017 |
| JP | 4065173 B2 | 3/2008 |
| JP | 4180339 B2 | 11/2008 |
| JP | 2017-128150 A | 7/2017 |
| JP | 2017-196933 A | 11/2017 |

* cited by examiner

*Primary Examiner* — Dennis H Pedder
(74) *Attorney, Agent, or Firm* — Oblon, McClelland, Maier & Neustadt, L.L.P.

(57) ABSTRACT

A sunroof apparatus for an automotive vehicle includes: a fixed glass panel having a first outer rim, and a movable glass panel having a second outer rim. A portion of the first outer rim of the fixed glass panel in the forward direction of the vehicle is adjacent to the movable panel and includes a water channel. A majority of the water channel is formed underneath of the movable glass panel such that the movable glass panel covers a majority of an upper open portion of the water channel when the movable glass panel is in a closed position.

8 Claims, 3 Drawing Sheets

OPTIMIZED MIDDLE RAIN CHANNEL

CROSS REFERENCE TO RELATED APPLICATIONS

This application is a continuation-in-part of U.S. application Ser. No. 16/132,774, filed Sep. 17, 2018.

BACKGROUND

Field of the Disclosure

The present disclosure is directed towards a middle rain channel for a vehicle sunroof.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Automotive vehicles may be provided with a sunroof or moonroof in the roof of the passenger compartment. A sunroof or moonroof assembly may include a glass panel in a window assembly. In the case of a sunroof assembly, an opening mechanism may also be included. The glass panel may include a movable glass panel and a fixed glass panel, or may include just a movable glass panel. The movable glass panel opens and closes a substantially rectangular opening defined by a periphery of a housing. The housing is mounted to an opening in the vehicle roof. A rain channel may be provided between the movable glass panel and the fixed glass panel to prevent rain from entering in the area between the movable glass panel and the fixed glass panel.

The rain channel may be formed along a rim portion of the fixed glass panel. The shape of the rain channel may have a U-shaped cross section shape with ends that extend to edges of the housing. The rain channel may include an outer vertical portion, an inner vertical portion, and an opening for rain to enter, thereby exposing the rain channel between the movable glass panel and the fixed glass panel.

Subsequently, the large and exposed rain channel allows for much water flow into the channel. Although a purpose of the channel is to guide water away from the area between the glass panels, allowing a maximum amount of water to enter the water channel may make the channel ineffective over time. For example, a rain channel typically includes a weather strip formed as the U-shaped channel. Over time, the weather strip may wear allowing water to eventually start to leak into the passenger compartment of a vehicle. These and other problems are addressed by the disclosure.

SUMMARY

The present disclosure relates to a sunroof apparatus for an automotive vehicle, including at least one fixed glass panel having an outer rim, at least one movable glass panel having an outer rim, an area between the outer rim of the movable glass panel in the width direction of the vehicle and the fixed panel includes a rain channel. A solution provided by the present disclosure is to cover a majority of the rain channel with the fixed panel to reduce the rate of water flow into the rain channel when the movable glass panel is in a closed position.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
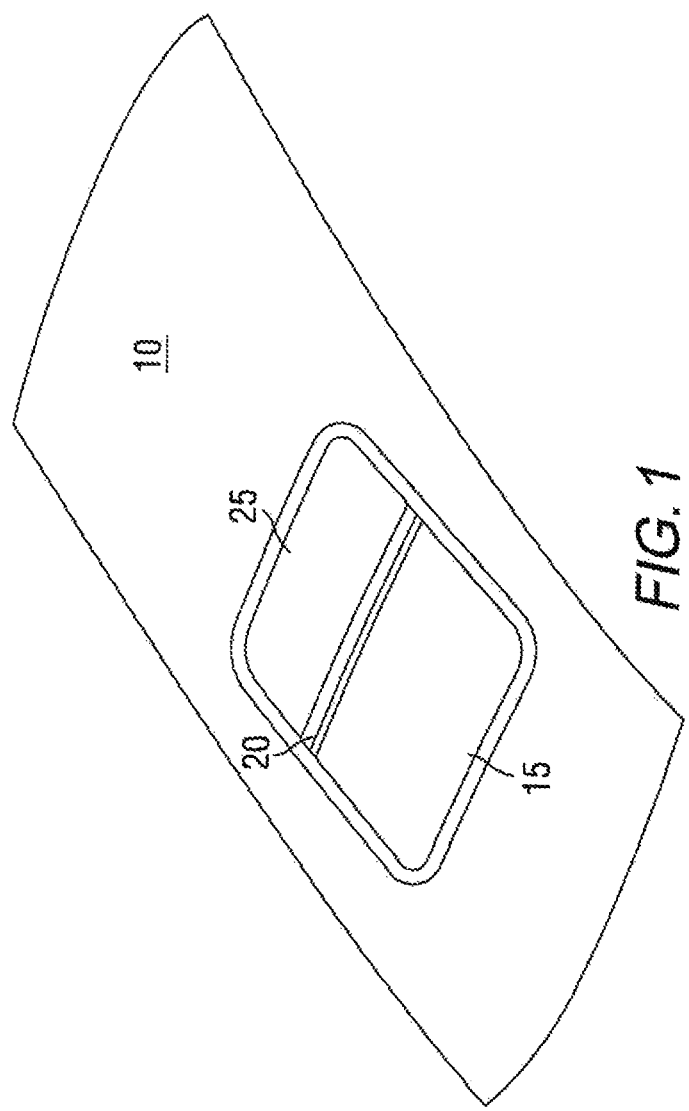
FIG. 1 is a schematic plan view of a sunroof apparatus for a vehicle according to an exemplary aspect of the disclosure.

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Referring now to the drawings, wherein like reference numerals designate identical or corresponding parts throughout several views, the following description relates to a sunroof assembly for an automotive vehicle. Automotive vehicles may be provided with sunroof assemblies having a fixed panel and a movable panel with a weather strip in between to serve as a rain channel. The rain channel results in a noticeable gap between the movable panel and the fixed panel. Also, the weather strip may suffer from wear and tear, such that over time water leakage may occur. Disclosed are embodiments that provide a solution to this problem.

A sunroof apparatus of a vehicle roof 10 will be explained. Hereinafter, a front/rear direction refers to a forward/rearward direction relative to a traveling direction of the vehicle having the roof 10. A right/left direction or a width direction refers to a direction of the vehicle relative to the front of the vehicle. An upward/downward direction refers to a direction relative to ground below the vehicle. FIG. 1 is a schematic plan view of a sunroof apparatus for a vehicle according to an exemplary aspect of the disclosure. The sunroof apparatus includes a movable glass panel 15, a fixed glass panel 25 and a rain channel 20 between the two panels. The movable glass panel 15 can move to a closed position over an opening portion of the same size. Although the drawing shows a single fixed panel and a single movable panel, the sunroof apparatus may have more than one fixed panel and/or more than one movable panel. A movable panel may be in a forward position toward the front of the vehicle. However, the movable panel may be in a rearward position, or in a middle position of the sunroof apparatus. The movable panel is arranged to be lifted at an end that is adjacent to a fixed panel and slid over the fixed panel. The water channel may include a weather strip made of a rubber material that covers a metal reinforced channel structure.

The movable glass panel 15 and a fixed glass panel 25 are encased by a housing that surrounds the outer rim of each panel when the movable glass panel 15 is in a closed position. To open the sunroof, the movable glass panel 15 is tilted upward and is slid along a pair of rails to a position above the fixed glass panel 25. Rims of the movable glass panel 15 and the fixed glass panel 25 may be of a light metal, such as aluminum or stainless steel. The housing also may be of a light metal.

Figure 2:
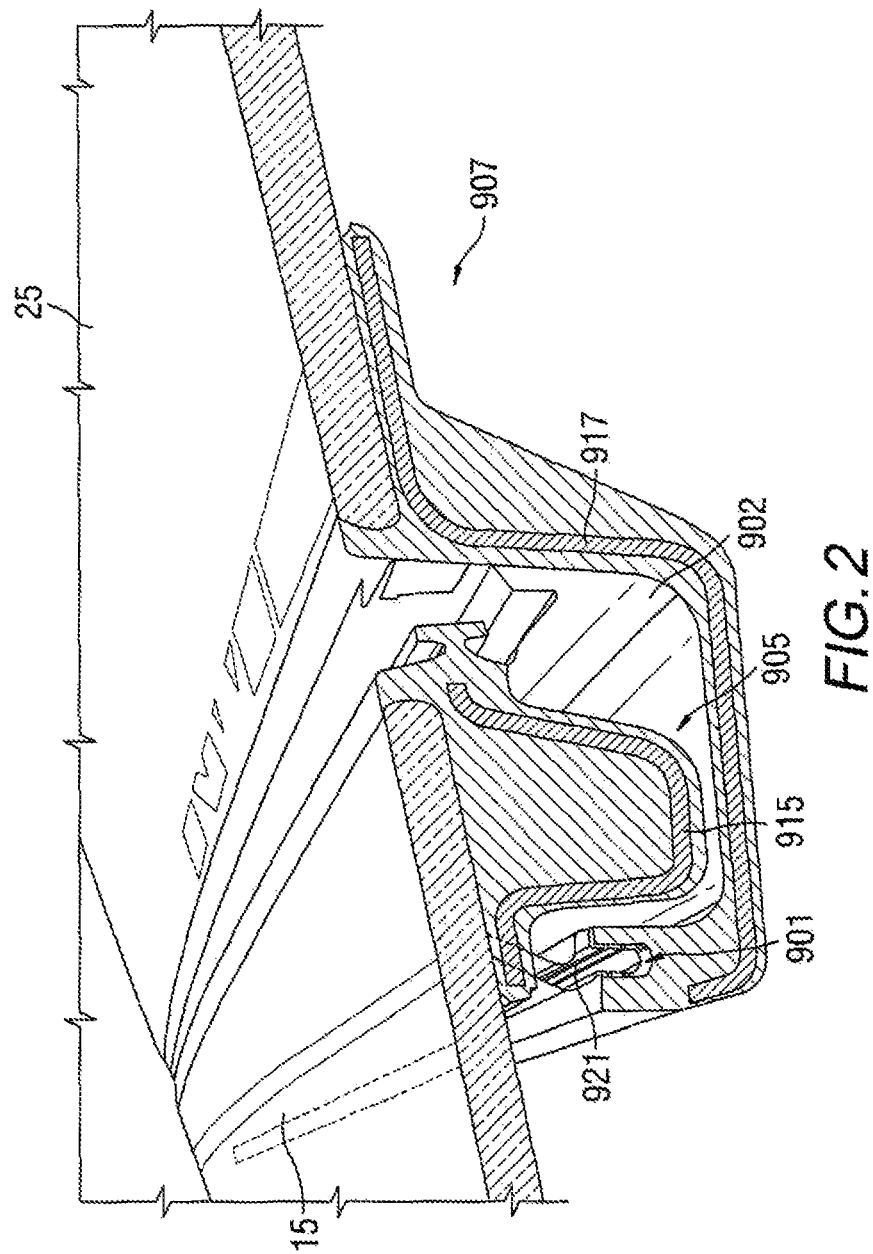
FIG. 2 is a partial view of a sunroof apparatus in the vicinity of an end in the width direction of a rain channel according to an exemplary aspect of the disclosure.

FIG. 2 is a partial view of a sunroof apparatus in the vicinity of a width direction end of a rain channel according to an exemplary aspect of the disclosure. In the closed position, the movable glass panel 15 is separate from a fixed glass panel 25 by a space that is sufficient to allow movement of the movable panel 15. A rim portion of the fixed glass panel 25 extends underneath the movable glass panel 15 and forms a middle rain channel 902. In some embodiments, a majority of the rain channel 902 is formed underneath of the such that the movable glass panel 15 covers a majority of an upper open portion of the rain channel 902 and spacing between the fixed glass panel 25 and the movable glass panel 15 corresponds to a remaining opening to the rain channel 902. In one embodiment, the majority of the upper open portion of the rain channel 902 that is covered by the movable glass panel 15 is at least three-quarters of the open portion of the rain channel 902 in the forward-rearward direction.

In particular, the rim of fixed glass panel 25 at an edge that is adjacent to the movable glass panel 15 may include a rain channel 902 having a U-shaped cross section in order to trap water. The U-shaped rain channel 902 has an edge-mounted vertical side that is attached to the fixed glass panel 25 and a second vertical side that is away from the edge-mounted vertical side in a rearward direction. The U-shaped rain channel 902 may be formed of a metal reinforcement 917 encased in a weather strip 921 of a rubber material. The second vertical side of the rain channel 902 is at least in the vicinity of the rim of the movable glass panel 15. The edge of the rim of the fixed glass panel 25 in the forward direction may include a mounting channel, or recess 901, that forms a secondary seal for the middle rain channel 902. With this arrangement, an end portion of the weather strip 921 of the second vertical side may form a seal with the underside of the rim of the movable glass panel 15 and prevent water from leaking into the vehicle cabin.

The movable glass panel 15 may include an end bracket 905 that rests inside the middle rain channel 902 in the closed position. The end bracket 905 protrudes in a downward direction at the end of the rim of the movable glass panel 15 in the rearward direction. The end bracket 905 may be reinforced with a metal insert 915 having a U-shaped cross-section that fits within the U-shaped cross section of the rain channel 902. Because the middle rain channel 902 is underneath the movable glass panel 15, the movable glass panel 15 and the fixed glass panel 25 have a one-piece appearance. A spacing area between the fixed glass panel 25 and the movable glass panel 15 allows water to enter into the spacing area. However, the close proximity of the movable glass panel 15 to the fixed glass panel 25 in the closed position serves to limit the rate of flow of water into the rain channel 902.

In addition, the movable glass panel 15 and the fixed glass panel 25 are spaced apart from each other so that the movable glass panel 15 is able to freely move into an open position and back to a closed position. In one embodiment, the weather strip 921 may be arranged to line the space between the movable glass panel 15 and the fixed glass panel 25. With this arrangement, the small amount of water leakage will be trapped by the rain channel 902.

Figure 3:
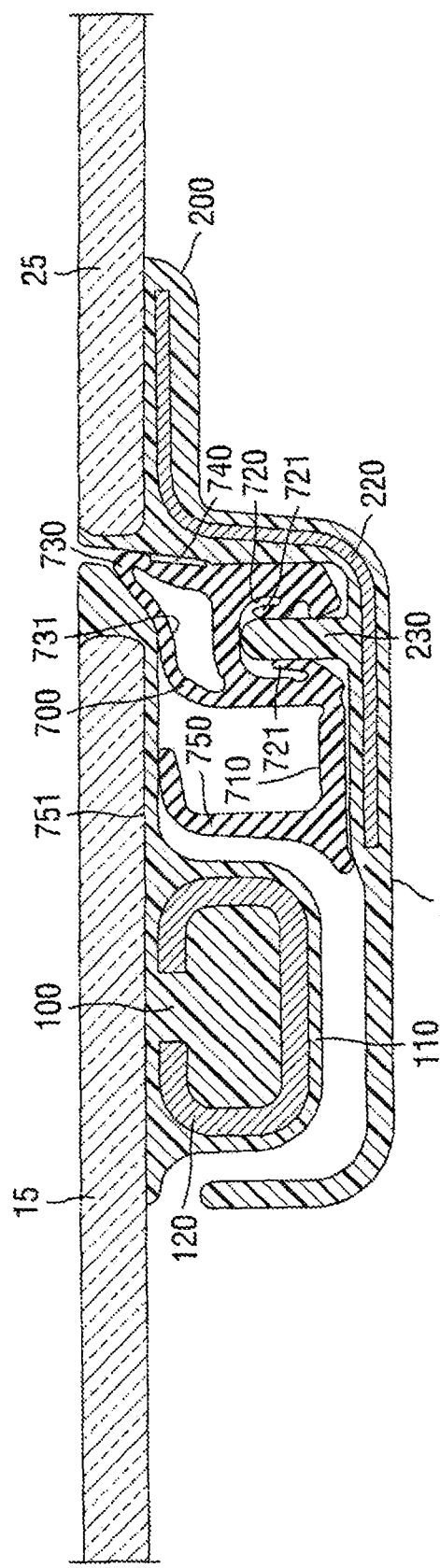
FIG. 3 is a partial view of a sunroof apparatus in the vicinity of an end in the width direction of a rain channel according to another exemplary aspect of the disclosure.

FIG. 3 is a partial view of a sunroof apparatus in the vicinity of an end in the width direction of a rain channel according to another exemplary aspect of the disclosure. In the closed position, the movable glass panel 15 is separate from a fixed glass panel 25 by a space that is sufficient to allow movement of the movable panel 15. A rim portion of the fixed glass panel 25 extends underneath the movable glass panel 15 and includes weather strip 700 formed a middle rain channel 710. The weather strip 700 is provided to cover a space between the movable glass panel 15 and the fixed glass panel 25 when the movable glass panel 15 is the closed position. The movable glass panel 15 includes a movable panel bracket 100 and the movable panel bracket 100 forms a part of a rim portion of the movable glass panel 15. In addition, the fixed glass panel 25 includes a fixed panel bracket 200, and the fixed panel bracket 200 forms a part of the rim portion of the fixed glass panel 25.

The movable panel bracket 100 includes a protrusion 110 protrudes in a downward direction at the end of the rim of the movable glass panel 15 in the rearward direction. The protrusion 110 is accommodated in the fixed panel bracket 200. Further, the protrusion 110 is reinforced with a metal insert 120 having a C-shaped cross-section. On the other hand, the fixed panel bracket 200 includes an extension portion 210 that is extended toward the movable glass panel 15 and is formed U-shaped cross section. The fixed panel bracket 200 is able to accommodate the movable panel bracket 100 and the weather strip 700. The extension portion 210 is reinforced with a metal insert 220 extended along a shape of the fixed panel bracket 200. The metal insert 220 extends from the fixed glass panel 25 toward the movable glass panel 15 and to approximately half the bottom area of the extension 210. The weather strip 700 is mounted on this area. In particular, the fixed panel bracket 200 includes a projection 230 that protrudes in a upward direction. The fixed panel bracket 200 can engages the weather strip 700 on this reinforced area by the projection 230.

The weather strip 700 includes the middle rain channel 710, a recess 720 to engage the projection, and a seal portion 730 to seal between the fixed glass panel 25 and the movable glass panel 15. A plurality of barbs 721 are provided in the recess 720. The barbs 721 are able to prevent the projection 230 from coming out of the recess 720. The seal portion 730 is located between the fixed glass panel 25 and the movable glass panel 15 and is formed on the recess 720. The seal portion 730 includes a cavity 731 for enabling shape deformation. The seal portion 730 can be deformed in shape by the cavity 731 even when in contact with the movable glass panel 15, and the seal portion 730 can keep the effect of the seal sufficiently. Therefore, when the movable glass panel 15 is in the closed position, the seal portion 730 can seal between the fixed glass panel 25 and the movable glass panel 15. The seal portion 730 has a flat portion 731 on the fixed glass panel 25 side, and a part of the flat portion 731 is fixed to the fixed panel bracket 200 by an adhesive member 740. In addition, the weather strip 700 includes an inner seal portion 750 that protrudes in an upward direction toward the movable glass panel 15. The tip 751 of the inner seal portion 750 is bent towards the fixed glass panel 25. The inner seal portion 750 can be bent toward the fixed glass panel 25 in conjunction with the movement of the movable glass panel 15 to the fixed glass panel 25, and the tip 751 can be kept in contact with the movable glass panel 15. Thus, the inner seal portion 750 is able to seal between the movable glass panel 15 and the weather strip 700. The middle rain channel 710 is located between the seal portion 730 and the inner seal portion 750. Even if the water droplets enter from the gap between the movable glass panel 15 and the weather strip 700, the middle rain channel 710 can catch the water droplets. Therefore, the weather strip 700 can prevent water droplets from entering the vehicle.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

What is claimed is:

1. A sunroof apparatus for an automotive vehicle, comprising:
   at least one fixed glass panel having a first outer rim;
   at least one movable glass panel having a second outer rim;
   a portion of the first outer rim of the fixed glass panel in the forward direction of the vehicle is adjacent to the movable panel and includes a water channel;
   a weather strip on an extension of the fixed glass panel, the water channel being formed on the weather strip; and
   an end bracket that protrudes in a downward direction at an end of the second outer rim in a rearward direction, wherein
   the end bracket is covered by the extension, and
   a majority of the water channel is formed underneath of the movable glass panel such that the movable glass panel covers a majority of an upper open portion of the water channel when the movable glass panel is in a closed position.

2. The sunroof apparatus of claim 1, further including a weather strip formed over a surface of the rain channel such that an edge of the water channel and the movable glass panel form a seal.

3. The sunroof apparatus of claim 2, wherein another edge of the weather strip is between the fixed glass panel and the movable glass panel in the forward direction.

4. The sunroof apparatus of claim 1, wherein the water channel is a space between the fixed glass panel and the movable glass panel.

5. The sunroof apparatus of claim 4, wherein the majority of the upper open portion of the water channel that is covered by the movable glass panel is at least three-quarters of the open portion of the water channel in the forward-rearward direction.

6. The sunroof apparatus of claim 1, further comprising:
   a projection that is formed to protrude in an upward direction on an extension of the fixed glass panel and to extend along the first outer rim,
   wherein the projection connects the weather strip.

7. The sunroof apparatus of claim 6, wherein the weather strip includes the water channel, a recess to engage the projection, and a seal portion to seal between the fixed glass panel and the movable glass panel.

8. The sunroof apparatus of claim 7, wherein a part of the seal portion is bonded to the fixed glass panel by an adhesive material.

* * * * *